(12) United States Patent
Lee et al.

(10) Patent No.: US 8,435,674 B2
(45) Date of Patent: May 7, 2013

(54) LITHIUM BATTERY

(75) Inventors: Dong-joon Lee, Seoul (KR); Dong-min Im, Seoul (KR); Young-gyoon Ryu, Suwon-si (KR); Seok-soo Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 229 days.

(21) Appl. No.: 12/856,864

(22) Filed: Aug. 16, 2010

(65) Prior Publication Data

US 2011/0151336 A1    Jun. 23, 2011

(30) Foreign Application Priority Data

Dec. 22, 2009    (KR) .................. 10-2009-0129132

(51) Int. Cl.
*H01M 10/40* (2006.01)

(52) U.S. Cl.
USPC .................. 429/231.2; 429/231.1; 429/231.3; 429/231.5; 429/324

(58) Field of Classification Search .................. None
See application file for complete search history.

(56) References Cited

U.S. PATENT DOCUMENTS

| | | | |
|---|---|---|---|
| 6,210,830 B1 | 4/2001 | Sartori et al. | |
| 6,743,947 B1 | 6/2004 | Xu et al. | |
| 7,008,726 B2 * | 3/2006 | Adamson et al. | 429/231.95 |
| 7,482,097 B2 * | 1/2009 | Saidi et al. | 429/231.9 |
| 2004/0091772 A1 | 5/2004 | Ravdel et al. | |
| 2005/0186476 A1 * | 8/2005 | Barker et al. | 429/231.95 |
| 2007/0141470 A1 * | 6/2007 | Nakura | 429/231.3 |
| 2012/0028121 A1 * | 2/2012 | Gauthier et al. | 429/221 |

FOREIGN PATENT DOCUMENTS

| | | | |
|---|---|---|---|
| JP | 63-121268 | | 5/1988 |
| JP | 03-043960 | | 2/1991 |
| JP | 7-153487 | | 6/1995 |
| JP | 2002-260735 | * | 9/2002 |
| JP | 2004-014351 | | 1/2004 |
| JP | 2004-134261 | * | 4/2004 |
| JP | 2006-004746 | | 1/2006 |
| JP | 2009-026675 | | 2/2009 |
| WO | WO 98/15562 | | 4/1998 |

* cited by examiner

*Primary Examiner* — John S Maples
(74) *Attorney, Agent, or Firm* — Lee & Morse, P.C.

(57) ABSTRACT

A lithium battery includes a cathode; an anode; and an organic electrolyte solution. The cathode includes cathode active materials that discharge oxygen during charging and discharging. The organic electrolyte solution includes: lithium salt; an organic solvent, and at least one selected from the group consisting of compounds represented by Formula 1 and Formula 2 below:

$$P(R_1)_a(OR_2)_b \quad \text{Formula 1}$$

$$O=P(R_1)_a(OR_2)_b. \quad \text{Formula 2}$$

$R_1$ is each independently a substituted or unsubstituted $C_1$-$C_{20}$ alkyl group or a substituted or unsubstituted $C_6$-$C_{30}$ aryl group. $R_2$ is each independently a substituted or unsubstituted $C_1$-$C_{20}$ alkyl group or a substituted or unsubstituted $C_6$-$C_{30}$ aryl group. a and b are each independently in a range of about 0 to about 3 and a+b=3.

9 Claims, 2 Drawing Sheets

LITHIUM BATTERY

CROSS-REFERENCE TO RELATED APPLICATION

This application claims the benefit of Korean Patent Application No. 10-2009-0129132, filed Dec. 22, 2009 in the Korean Intellectual Property Office, the disclosure of which is incorporated herein in its entirety by reference.

BACKGROUND

1. Field

The present disclosure relates to lithium batteries.

2. Description of the Related Art

Small-sized and light-weighted lithium batteries are important for miniaturization and high performance of various devices. Also, stability and cycle characteristics of lithium batteries at a high voltage are important as they may be applied to various fields, such as electrical vehicles. Accordingly, cathode active materials having high driving voltages and large discharge capacities may be considered. However, the cathode active materials having high driving voltages and large discharge capacities are electrically unstable. This results in gas being generated by side reactions during charging and discharging which may increase an internal pressure may increase in the batteries. As a result, the stability of lithium batteries decreases.

Accordingly, lithium batteries having high driving voltages, large discharge capacities, and improved stability are required.

SUMMARY

Aspects of the invention relate to lithium batteries.

According to an aspect of the present invention, a lithium battery includes a cathode; an anode; and an organic electrolyte solution, wherein the cathode includes cathode active materials that discharge oxygen during charging and discharging and the organic electrolyte solution comprises: lithium salt; an organic solvent, and at least one selected from the group consisting of compounds represented by Formula 1 and Formula 2:

  <Formula 1>

  <Formula 2> wherein, in Formulae 1 and 2, $R_1$ is each independently a substituted or unsubstituted $C_1$-$C_{20}$ alkyl group or a substituted or unsubstituted $C_6$-$C_{30}$ aryl group;

$R_2$ is each independently a substituted or unsubstituted $C_1$-$C_{20}$ alkyl group or a substituted or unsubstituted $C_6$-$C_{30}$ aryl group;

a and b are each independently in a range of about 0 to about 3; a+b=3;

if a is equal to or greater than 2, a plurality of $R_1$ may each be different; and if b is equal to or greater than 2, a plurality of $R_2$ may each be different.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
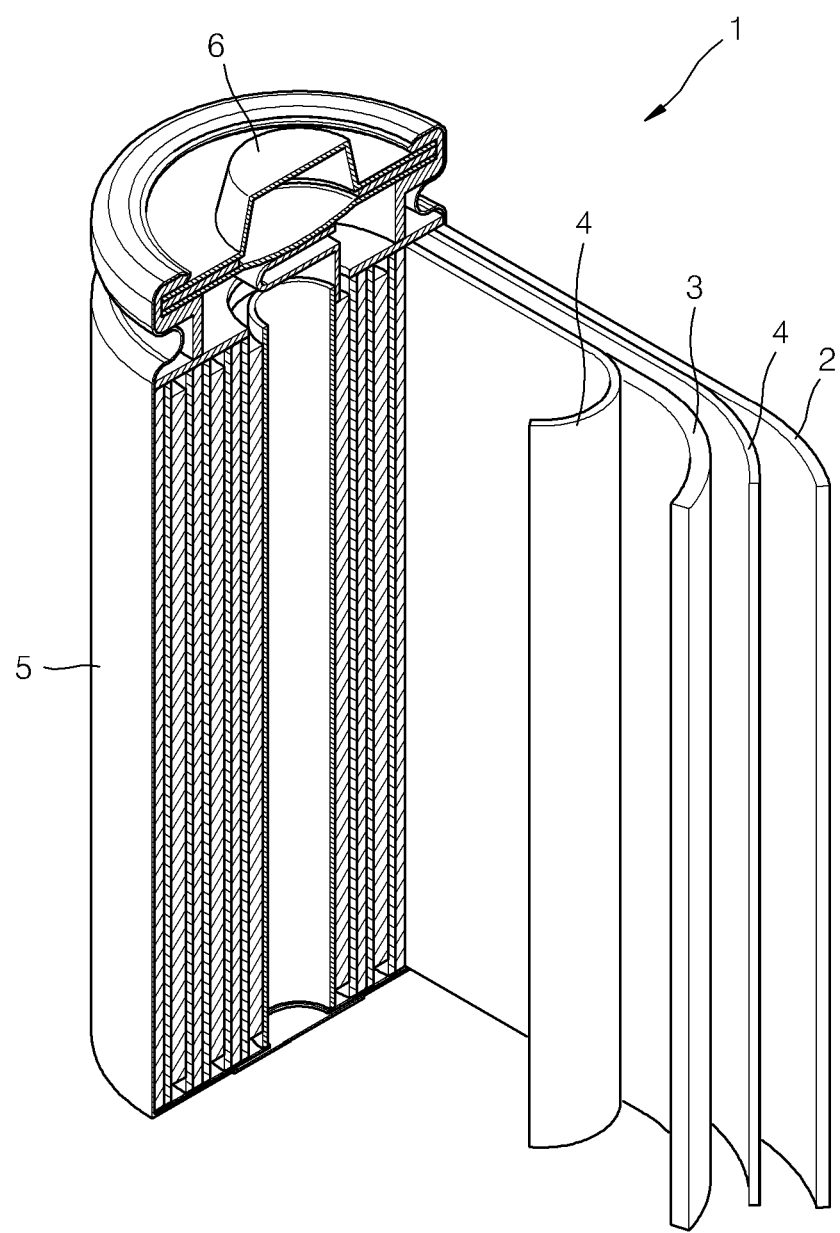
FIG. 1 is a schematic view of a lithium battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a lithium battery 1 according to one or more embodiments of the present invention will be described more fully with reference to FIGS. 1 through 2B. The lithium battery 1 includes a cathode 3; an anode 2; and an organic electrolyte solution. The cathode 3 includes cathode active materials that discharge oxygen during charging and discharging. The organic electrolyte solution includes: lithium salt; an organic solvent, and compounds represented by Formula 1 and/or Formula 2:

  <Formula 1>

  <Formula 2>

In Formulae 1 and 2, $R_1$ is each independently a substituted or unsubstituted $C_1$-$C_{20}$ alkyl group or a substituted or unsubstituted $C_6$-$C_{30}$ aryl group; $R_2$ is each independently a substituted or unsubstituted $C_1$-$C_{20}$ alkyl group or a substituted or unsubstituted $C_6$-$C_{30}$ aryl group; a and b are each independently in the range of about 0 to about 3; a+b=3; if a is equal to or greater than 2, a plurality of $R_1$ may each be different, and if b is equal to or greater than 2, a plurality of $R_2$ may each be different.

The compounds represented by Formula 1 and/or Formula 2 and oxygen gas discharged from the cathode active materials during charging and discharging are subjected to a reaction, thereby removing oxygen gas.

Unpaired electrons of phosphor (P) atoms in the compound represented by Formula 1 may be bonded to oxygen. For example, the volume of 1 mol oxygen in a gas state is about 22.4 L under standard conditions for temperature and pressure (STP), whereas the volume of liquefied oxygen is about 10 mL. Accordingly, the volume of oxygen is reduced to about 1/1000. Thus, if the oxygen gas is removed by the reaction and other compounds that may be dissolved in an electrolyte solution are formed, an increase in internal pressure occurring due to the oxygen gas in a battery may be mostly suppressed. Consequently, deterioration of a battery due to an increase in internal pressure may be prevented. In general, when the internal pressure of the battery increases above a predetermined critical value, a ventilation system in the battery is triggered and thus use of the battery is not possible anymore.

The compound represented by Formula 1 may be included while first assembling the lithium battery 1 according to an aspect of the invention. A part or all of the compound represented by Formula 1 may be converted into the compound represented by Formula 2 due to oxygen gas generated by charging and discharging of the assembled lithium battery. The lithium battery 1 may include the compounds represented by Formula 1 and/or Formula 2 according to an aspect of the invention.

Substituents of the alkyl group and the aryl group in Formula 1 and Formula 2 may each independently include at least one selected from the group consisting of a nitro group, an amino group, a hydroxy group, a halogen group, a cyano group, a carboxyl, a $C_1$-$C_{20}$ alkyl group, and a $C_1$-$C_{20}$ alkoxy group.

Examples of the $C_1$-$C_{20}$ alkyl group in Formula 1 and Formula 2 may include methyl, ethyl, propyl, isobutyl, n-butyl, sec-butyl, tert-butyl, pentyl, iso-amyl, hexyl, heptyl, octyl, nonyl, decyl, or dodecyl.

The $C_6$-$C_{30}$ aryl group in Formulae 1 and 2 denotes a carbocyclic aromatic system having 6-30 carbon atoms including at least one aromatic ring, wherein the at least one aromatic rings may be fused together or linked to each other through, for example, a single bond. Examples of the substituted or unsubstituted $C_6$-$C_{30}$ aryl group may include a phenyl group, a $C_1$-$C_{10}$ alkylphenyl group (for example, an ethylphenyl group, a methylphenyl group, a propylphenyl group), a halophenyl group (for example, an o-, m-, or p-fluorophenyl group, and a dichlorophenyl group), an o-, m-, or p-hydroxyphenyl group, a cyanophenyl group, a dicyanophenyl group, a trifluoromethoxyphenyl group, a biphenyl group, a halobiphenyl group, a cyanobiphenyl group, a $C_1$-$C_{10}$ alkylbiphenyl group, a $C_1$-$C_{10}$ alkoxybiphenyl group, an o-, m-, or p-tolyl group, an o-, m-, or p-cumenyl group, a mesityl group, a phenoxyphenyl group, a (α,α-dimethylbenzene)phenyl group, a (N,N'-dimethyl)aminophenyl group, a (N,N'-diphenyl)aminophenyl group, a pentalenyl group, an indenyl group, a naphthyl group, a halonaphthyl group (for example, a fluoronaphthyl group), a $C_1$-$C_{10}$ alkylnaphthyl group (for example, methylnaphthyl group), a $C_1$-$C_{10}$ alkoxynaphthyl group (for example, a methoxynaphthyl group), a cyanonaphthyl group, an anthracenyl group, an azulenyl group, a heptalenyl group, an acenaphthyllenyl group, a phenalenyl group, a fluorenyl group, an anthraquinolyl group, a methylanthryl group, a phenanthryl group, a triphenylene group, a pyrenyl group, a chrycenyl group, an ethyl-chrycenyl group, a picenyl group, a perylenyl group, a chloroperylenyl group, a pentaphenyl group, a pentacenyl group, a tetraphenylenyl group, a hexaphenyl group, a hexacenyl group, a rubicenyl group, a coronelyl group, a trinaphthylenyl group, a heptaphenyl group, a heptacenyl group, a pyranthrenyl group, or an ovalenyl group.

For example, in the compounds represented by Formula 1 and Formula 2, $R_1$ may be a substituted or unsubstituted $C_6$-$C_{13}$ aryl group and $R_2$ may be a substituted or unsubstituted a $C_1$-$C_7$ alkyl group.

For example, the compound represented by Formula 1 may include at least one selected from the group consisting of $P(C_6H_5)_3$, $P(C_6H_5)_2(C_6H_4$-p-$CH_3)$, $P(CH_2CH_2CH_2CH_3)_3$, $P(OCH_3)_3$, $P(OCH_2CH_3)_3$, $P(C_6H_5)_2(OCH_2CH_3)$, $P(C_6H_5)(OCH_3)_2$, $P(OCH_2CH_2CH_2CH_3)_3$, and $P(CH_2CH_3)_3$. The compound represented by Formula 2 may include at least one selected from the group consisting of $O=P(C_6H_5)_3$, $O=P(C_6H_5)_2(C_6H_4$-p-$CH_3)$, $O=P(CH_2CH_2CH_2CH_3)_3$, $O=P(OCH_3)_3$, $O=P(OCH_2CH_3)_3$, $O=P(C_6H_5)_2(OCH_2CH_3)$, $O=P(C_6H_5)(OCH_3)_2$, $O=P(OCH_2CH_2CH_2CH_3)_3$, and $O=P(CH_2CH_3)_3$.

The amount of the compounds represented by Formulae 1 and 2 in the lithium battery 1 may be in the range of about 0.5 to about 10 parts by weight % based on the total amount of the organic electrolyte solution. However, the range is not limited thereto and the amount of the compound may be within any range that may suppress the generation of oxygen gas and improve a lifespan of the lithium battery 1. For example, the amount of the compounds represented by Formula 1 and/or Formula 2 may be in the range of about 1 to about 10 parts by weight % or about 1 to about 5 parts by weight % based on the total amount of the organic electrolyte solution.

If the amount of the compounds represented by Formulae 1 and 2 exceeds the above range, capacity realization of the battery may be reduced due to high electrochemical decomposition and if the amount of the compounds represented by Formulae 1 and 2 is below the above range, generated oxygen may not be sufficiently removed.

While not required in all aspects, the lithium battery may include a cathode active material represented by Formula 3 below that discharges oxygen during charging and discharging:

$$Li_{1+x}M_yO_z$$

wherein, $$0<x\leq 1.5, 0<y\leq 2, 2\leq z\leq 4,  \qquad <\text{Formula 3}>$$

and M is at least one metal selected from the group consisting of titanium (Ti), vanadium (V), chromium (Cr), manganese (Mn), iron (Fe), cobalt (Co), nickel (Ni), copper (Cu), aluminum (Al), magnesium (Mg), zirconium (Zr), molybdenum (Mo), and boron (B).

The cathode active material represented by Formula 3 may be an overlithiated oxide (OLO) having an excess of lithium by a molar ratio of 1. A lithium metal oxide including an excessive amount of lithium has high driving voltage and large discharge capacity but is electrically unstable, thereby discharging oxygen during an oxidation reduction reaction. For example, x may be $0.5<x\leq 1.5$.

For example, the composition of the OLO, which is a high-capacity cathode active material, is as follows.

Composition of OLO: ½$Li_2MnO_3$·½$LiNi_{0.33}Co_{0.33}Mn_{0.33}O_2$

An oxygen ion in $Li_2MnO_3$ of the cathode active material in the composition is partially oxidized during charging and the following reaction occurs.

$$Li_2MnO_3 \rightarrow 2Li^+ + 2e^- + MnO_2 + \tfrac{1}{2}O_2$$

Also, the cathode active material may be LNO ($Li_2NiO_2$) and the following reaction occurs during charging.

$$Li_2NiO_2 \rightarrow 2Li^+ + 2e^- + NiO + \tfrac{1}{2}O_2$$

That is, in the high-capacity cathode active material, oxygen may be generated during charging.

The discharged oxygen may be removed by the reaction with the compounds represented by Formula 1 and/or Formula 2.

For example, the compound represented by Formula 3 or a composite compound including the compound represented by Formula 3 as an element may include, but is not limited to, at least one compound selected from the group consisting of $xLiMO_2 \cdot (1-x)Li_2M'O_3$ (where $0\leq x<1$, M is at least one metal having an average oxidation number of +3 and is selected from the group consisting of Ti, V, Cr, Mn, Fe, Co, Ni, Cu, Al, Mg, Zr, Mo, and B and M' is at least one metal having an average oxidation number of +4 and is selected from the group consisting of Ti, V, Cr, Mn, Fe, Co, Ni, Cu, Al, Mg, Zr, Mo, and B) and $Li_2MO_2$ (where M is at least one metal selected from the group consisting of Ni, Co, Fe, Cu, Ti, and V). Any lithium metal oxide that discharges oxygen gas during charging and discharging may be used.

Also, the lithium metal in the compound represented by Formula 3 may be partially substituted with other alkali metal. For example, such a compound may be represented by Formula 4 below.

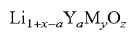 <Formula 4>

In Formula 4, $0<x\leq1.5$, $0<y\leq2$, $2\leq z\leq4$, $0<a<1$, M is at least one metal selected from the group consisting of Ti, V, Cr, Mn, Fe, Co, Ni, Cu, Al, Mg, Zr, Mo, and B, and Y is an alkali metal. For example, the other alkali metal may be sodium. In Formula 4, x may be $0.5<x\leq1.5$.

Also, oxygen in the compound represented by Formula 3 may be partially substituted with halogen. For example, such a compound may be represented by Formula 5 below.

 <Formula 5>

In Formula 5, $0<x\leq1.5$, $0<y\leq2$, $2\leq z\leq4$, $0<b<1$, M is at least one metal selected from the group consisting of Ti, V, Cr, Mn, Fe, Co, Ni, Cu, Al, Mg, Zr, Mo, and B, and X is halogen. For example, the halogen may be fluorine (F).

The concentration of lithium salt included in the organic electrolyte solution may be in the range of about 0.5 to about 3 M. However, the range is not limited thereto and the concentration of lithium salt may be within any range that may suppress the generation of oxygen gas and improve a lifespan of the lithium battery. For example, the concentration of lithium salt may be in the range of about 0.1 to about 2 M.

If the concentration of lithium salt is excessively low, conductivity of the organic electrolyte solution is low and thus performance of the organic electrolyte solution decreases. If the concentration of lithium salt is excessively high, viscosity of the organic electrolyte solution increases and mobility of lithium ions reduces.

Any lithium salts that are generally used in lithium batteries may be used. Examples of the lithium salt may include at least one selected from the group consisting of $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$.

An organic solvent included in the organic electrolyte solution may include high-dielectric constant solvents and low-boiling point solvents. However, the present invention is not limited thereto and the organic solvent may be appropriately selected within a range that may suppress the generation of oxygen gas and improve a lifespan of lithium batteries.

The high-dielectric constant solvent used in the organic electrolyte solution may be any solvent that is commonly used. Examples of the high-dielectric constant solvent may include cyclic carbonates such as ethylene carbonate, propylene carbonate, or butylene carbonate; gamma-butyrolactone; or a mixture thereof.

The low-boiling point solvent used in the organic electrolyte solution may be any solvent that is commonly used. Examples of the low-boiling point solvent may include chain carbonates such as dimethyl carbonate, ethylmethyl carbonate, diethyl carbonate, or dipropyl carbonate; dimethoxyethane; diethoxyethane; fatty acid ester derivative; or a mixture thereof.

When the high-dielectric constant solvent and the low-boiling point solvent are mixed, a mixture ratio thereof may be in the range of about 9:1 to about 1:9. However, the present invention is not limited thereto and the mixture ratio may be within any range that may suppress the generation of oxygen gas and improve a lifespan of the lithium battery. For example, the mixture ratio may be in the range of about 1:1 to about 1:9.

The lithium battery 1 may be, for example, a lithium secondary battery such as a lithium ion battery, a lithium ion polymer battery, a lithium sulfur battery, or the like, or a lithium primary battery.

A method of manufacturing the lithium battery 1 will now be described in more detail.

First, a cathode active material, a conducting agent, a binder, and a solvent are mixed to prepare a cathode active material composition. The cathode active material composition may be directly coated on an aluminum collector and dried to prepare the cathode 3. Alternatively, the cathode active material composition may be cast on a separate support and then a cathode active material film exfoliated from the support may be laminated on the aluminum collector to prepare the cathode 3.

The cathode active material may be at least one of the compounds represented by Formulae 3 through 5.

The conducting agent may be carbon black. The binder may be a vinylidenefluoride/hexafluoropropylene copolymer, polyvinylidenefluoride (PVdF), polyacrylonitrile, polymethylmethacrylate, polytetrafluoroethylene or a mixture thereof, or a styrene butadiene rubber polymer. The solvent may be N-methylpyrrolidone (NMP), acetone, or water. The amounts of the cathode active material, the conducting agent, the binder, and the solvent are the same as those commonly used in a lithium battery.

Similarly to the preparing of the cathode plate, an anode active material, a conducting agent, a binder, and a solvent are mixed to prepare an anode active material composition. The anode active material composition is directly coated on a copper current collector to prepare the anode 2. Alternatively, the anode material composition may be cast on a separate support and then an anode active material film exfoliated from the support is laminated on the copper current collector to prepare the anode 2. The amounts of the anode active material, the conducting agent, the binder, and the solvent are the same as those commonly used in a lithium battery.

The anode active material may be a silicon metal, a silicon thin film, a lithium metal, a lithium alloy, a carbonaceous material, or graphite, but not limited thereto. The conducting agent, the binder and the solvent in the anode active material composition are the same as those in the cathode active material composition. In some cases, a plasticizer may be added to the cathode active material composition and the anode active material composition to produce pores inside the electrode plates.

The separator 4 may be any separator used commonly in forming a lithium battery. Specifically, the separator 4 may have a low resistance to ion mobility and excellent electrolyte solution retaining properties. Examples of the separator 4 may include glass fiber, polyester, TEFLON, polyethylene, polypropylene, polytetrafluoroethylene (PTFE), or a combination thereof, each of which may be a nonwoven fabric or a woven fabric. More specifically, a lithium ion battery uses a foldable separator formed of polyethylene or polypropylene, and a lithium ion polymer battery uses a separator having an excellent organic electrolyte solution retaining capability. A method of preparing these separators will now be described in detail.

A polymer resin, a filler, and a solvent are mixed to prepare a separator composition. The separator composition may be directly coated on an electrode 2 or 3 and then dried to form a separator film. Alternatively, the separator composition may be cast on a support and then dried to form a separator composition film. The separator composition film is exfoliated from the support and laminated on an electrode 2 or 3, to form a separator film.

The polymer resin is not particularly restricted and may be any material that can be used as a binder for an electrode plate. Examples of the polymer resin may include a vinylidenefluoride/hexafluoropropylene copolymer, polyvinylidenefluoride, polyacrylonitrile, polymethylmethacrylate, or mixtures thereof. In particular, a vinylidenefluoride/hexafluoropropylene copolymer having 8 to 25 weight % of hexafluoropropylene may be used.

Referring to FIG. 1, the lithium battery 1 according to an aspect of the invention includes the cathode 3, the anode 2, and the separator 4. The cathode 3, the anode 2, and the separator 4 are wound or folded, and then sealed in a battery case 5. Then, the battery case 5 is filled with an organic electrolyte solution including the compounds represented by Formula 1 and/or Formula 2 and sealed with a cap assembly 6, thereby completing the manufacture of the lithium battery 1. The battery case 5 may be a cylindrical type, a rectangular type, or a thin-film type. For example, the lithium battery 1 may be a thin-film type battery. The lithium battery 1 may be a lithium ion battery.

The separator 4 is interposed between the cathode 3 and the anode 2 to form a battery assembly. The battery assembly may be stacked in a bi-cell structure and impregnated with the electrolyte solution. Then, the resultant is put into a pouch and sealed, thereby completing the manufacture of a lithium ion polymer battery.

Hereinafter, one or more embodiments of the present invention will be described in more detail with reference to the following examples. However, these examples are not intended to limit the scope of the one or more embodiments of the present invention.

Preparation of Electrolyte Solution

Example 1

5% weight % triphenyl phosphine represented by Formula 6 was added to an organic solvent obtained by mixing ethylenecarbonate, ethylmethylcarbonate, and diethylcarbonate in a volume ratio of 3:2:5, and 1.3 M of $LiPF_6$ was added to the resultant to prepare an organic electrolyte solution.

$$P(C_6H_5)_3 \qquad \text{<Formula 6>}$$

Example 2

An organic electrolyte solution was prepared in the same manner as in Example 1 except that diphenyl (p-tolyl) phosphine represented by Formula 7 was used instead of the compound represented by Formula 6.

$$P(C_6H_5)_2(C_6H_5\text{-}p\text{-}CH_3) \qquad \text{Formula 7}$$

Example 3

An organic electrolyte solution was prepared in the same manner as in Example 1 except that tributylphosphine represented by Formula 8 was used instead of the compound represented by Formula 6.

$$P(CH_2CH_2CH_2CH_3)_3 \qquad \text{Formula 8}$$

Example 4

An organic electrolyte solution was prepared in the same manner as in Example 1 except that trimethyl phosphite represented by Formula 9 was used instead of the compound represented by Formula 6.

$$P(OCH_3)_3 \qquad \text{Formula 9}$$

Example 5

An organic electrolyte solution was prepared in the same manner as in Example 1 except that triethyl phosphite represented by Formula 10 was used instead of the compound represented by Formula 6.

$$P(OCH_2CH_3)_3 \qquad \text{Formula 10}$$

Example 6

An organic electrolyte solution was prepared in the same manner as in Example 1 except that ethyl diphenylphosphinite represented by Formula 11 was used instead of the compound represented by Formula 6.

$$P(C_6H_5)_2(OCH_2CH_3) \qquad \text{Formula 11}$$

Example 7

An organic electrolyte solution was prepared in the same manner as in Example 1 except that dimethyl phenylphosphonite represented by Formula 12 was used instead of the compound represented by Formula 6.

$$P(C_6H_5)(OCH_3)_2 \qquad \text{Formula 12}$$

Example 8

An organic electrolyte solution was prepared in the same manner as in Example 1 except that tributyl phosphate represented by Formula 13 was used instead of the compound represented by Formula 6.

$$P(OCH_2CH_2CH_2CH_3)_3 \qquad \text{Formula 13}$$

Example 9

An organic electrolyte solution was prepared in the same manner as in Example 1 except that tributyl phosphine oxide represented by Formula 14 was used instead of the compound represented by Formula 6.

$$O=P(CH_2CH_3)_3 \qquad \text{Formula 14}$$

Comparative Example 1

An organic electrolyte solution was prepared in the same manner as in Example 1 except that the compound represented by Formula 6 was not added.

Preparation of Cathode Active Material

Preparation Example 1

Lithium carbonate, nickel acetate, cobalt acetate, manganese acetate, and ammonium heptamolybdate were selected as starting materials for preparing the cathode active material.

The starting materials were prepared by calculating the molar ratio between Li, Ni, Co, Mn, and Mo to prepare 0.04 mol of $Li[Li_{0.2}Ni_{0.16}Co_{0.08}Mn_{0.54}Mo_{0.02}]O_2$.

The starting materials were dissolved in 50 ml of a weak nitric acid aqueous solution obtained by mixing 5 g of nitric acid (60 weight %) and 50 ml of distilled water. Then, 50 ml of a citric acid aqueous solution (2 M) and 30 ml of ethylene glycol were added to the solution to prepare a sol.

The sol was heated and water therein was vaporized to form a gel. The gel was continuously heated and thermally decomposed. The thermally decomposed gel was put in a furnace and thermally treated at about 1000° C. for about 5 hours by blowing dry air therein, thereby preparing the cathode active material. The cathode active material was cooled in the furnace. Then, $Li[Li_{0.2}Ni_{0.16}Co_{0.08}Mn_{0.54}Mo_{0.02}]O_2$ was obtained.

Manufacture of Lithium Battery

Example 10

Powder, a binder, and a conducting agent (super P) were added in a weight ratio of 94:3:3 to an agate mortar and mixed to prepare a slurry. The powder was obtained by mixing $Li_{1.167}Ni_{0.2333}Co_{0.1}Mn_{0.4667}Mo_{0.033}O_2$ obtained in Example 1 and $LiCoO_2$ in a weight ratio of 3:7. The binder was obtained by dissolving 5 weight % of polyvinylidene fluoride (PVdF) in N-methylpyrrolidone (NMP).

The slurry was cast on an aluminum foil having a thickness of about 15 μm by using a doctor blade having intervals of about 100 μm, thereby obtaining a cathode. The cathode was put in an oven at 90° C. and firstly dried for about 2 hours so as to evaporate NMP. The cathode was secondly dried in an oven at 120° C. for about 2 hours so as to completely evaporate NMP. Then, the cathode was pressed to obtain a cathode having a thickness of about 60 μm.

Next, a powder and a binder were added in a weight ratio of 90:10 to a mortar and mixed to prepare a slurry. The powder was silicon oxide (SiO) and the binder was obtained by dissolving polyamideimide in 5 weight % of N-methylpyrrolidone (NMP). The slurry was cast on a copper foil having a thickness of about 10 μm by using a doctor blade having intervals of about 60 μm, thereby obtaining an anode. Then, the anode was firstly dried in an oven at 90° C. for about 2 hours and was pressed to have a thickness of about 47 μm. The anode was cured in a vacuum oven at 200° C. for about 1 hour, thereby obtaining an anode.

The anode, the cathode, a polyethylene separator (Celgard 3501), and the organic electrolyte solution obtained in Example 1 were used to manufacture an AAA-size lithium battery.

Examples 11 to 18

Lithium batteries were manufactured in the same manner as in Example 10 except that the organic electrolyte solutions manufactured in Examples 2 through 9 were used instead of the organic electrolyte solution manufactured in Example 1.

Examples 19 to 27

Lithium batteries were manufactured in the same manner as in Examples 10 through 18 except that a hole having a diameter of 3 mm was formed on the bottom of a can of the batteries.

Comparative Example 2

A lithium battery was manufactured in the same manner as in Example 10 except that the organic electrolyte solution manufactured in Comparative Example 1 was used instead of the organic electrolyte solution manufactured in Example 1.

Comparative Example 3

A lithium battery was manufactured in the same manner as in Comparative Example 2 except that a hole having a diameter of 3 mm was formed on the bottom of a can of the battery.

Reference Example 1

A lithium battery was manufactured in the same manner as in Comparative Example 3 except that only $LiCoO_2$ was used instead of the cathode active materials manufactured in Example 1 in which $Li_{1.167}Ni_{0.2333}Co_{0.1}Mn_{0.4667}Mo_{0.033}O_2$ and $LiCoO_2$ were mixed in a weight ratio of 3:7 and a circular 18650 sized battery was manufactured instead of an AAA size battery.

Evaluation Example 1

Measurement of Internal Pressure of Battery

The lithium batteries manufactured in Examples 19 through 27 and Comparative Examples 3 through 4 were charged at a constant current of 0.05 C for about 28 hours until a battery voltage reached 4.53 V. Then, the lithium batteries were left charged for about 12 hours and then discharged at a constant current of 0.05 C for about 20 hours until a battery voltage reached 2.75 V. While charging and discharging were performed, the hole formed in the can of the battery was fixed using a jig and internal pressure of the battery was measured through the hole having a diameter of 3 mm formed during manufacturing the lithium batteries using a VPRF2 series pressure sensor manufactured by Valcom. The maximum values of the values of internal pressure according to time of charging and discharging of the lithium batteries manufactured in Examples 19 through 27 and Comparative Examples 3 and 4 are shown in Table 1. The internal pressure before performing charging and discharging was 0 bar. The internal pressures of the batteries were increased during charging and discharging and then were decreased.

TABLE 1

| | Maximum value of internal pressure in lithium batteries [bar] |
|---|---|
| Example 19 | 1.8 |
| Example 20 | 1.4 |
| Example 21 | 1.4 |
| Example 23 | 1.0 |
| Example 24 | 1.2 |
| Example 25 | 1.4 |
| Example 26 | 1.3 |
| Comparative Example 3 | 3.0 |
| Reference Example 1 | 0.7 |

As shown in Table 1, the internal pressures of the lithium batteries manufactured in Examples 19 through 27 which include the organic electrolyte solution including a compound that may react with oxygen gas were significantly reduced compared with those of the lithium battery manufactured in Comparative Example 3 which does not include such a compound.

In regard to the circular 18650 sized lithium battery manufactured in Reference Example 1 using $LiCoO_2$, which does not generate oxygen gas during charging and discharging, an amount of cathode active material contained in the 18650 cell is larger than that of the AAA-sized lithium battery manufactured in Comparative Example 3 and thus the discharge capacity thereof increased by about 6 times (first cycle discharge capacity of about 4000 mAh) due to inclusion of a large amount of cathode active material. However, a change in the internal pressure in the lithium battery was not great.

Evaluation Example 2

Figure 2A:
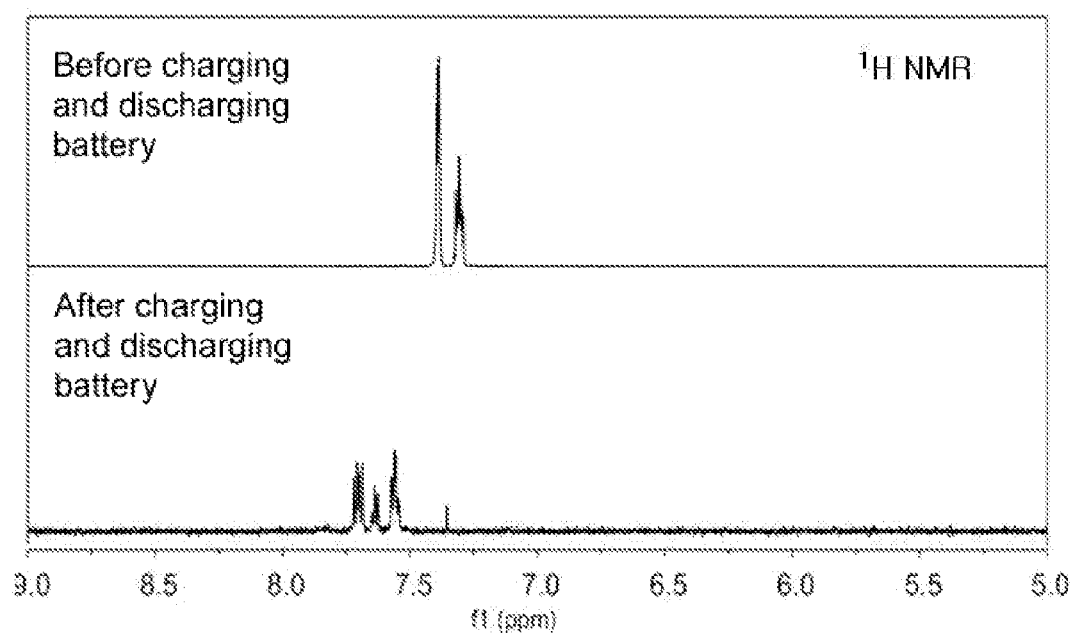
FIG. 2A is a graph showing results of $^1$H-nuclear magnetic resonance ($^1$H-NMR) spectrum for an organic electrolyte solution measured before and after charging and discharging a lithium battery of an Example of the present invention.
Figure 2B:
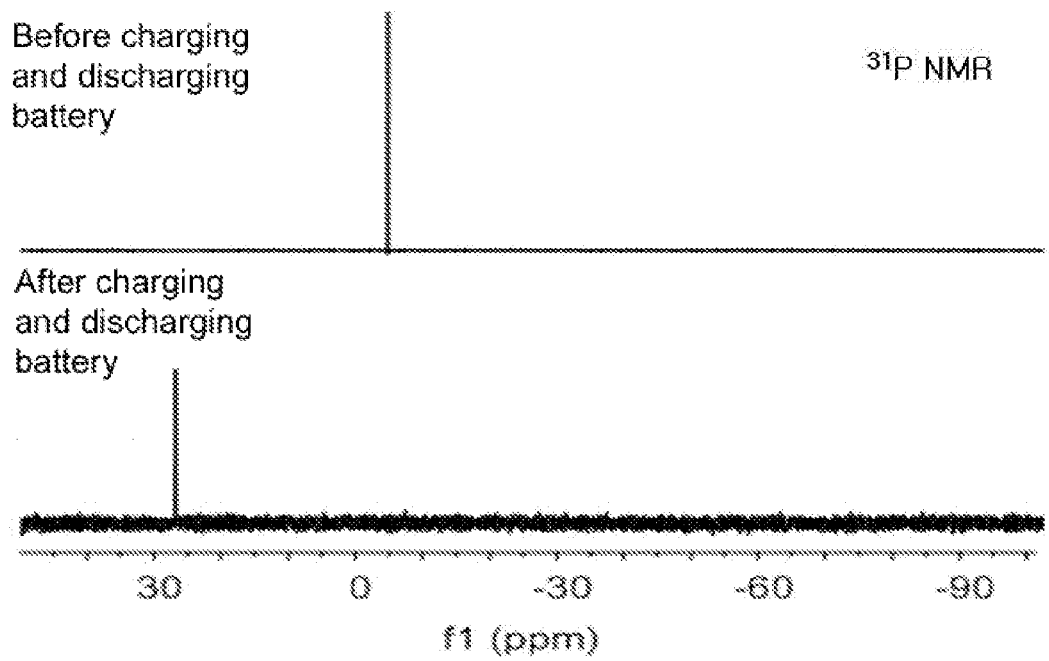
FIG. 2B is a graph showing results of $^{31}$P-NMR spectrum for the organic electrolyte solution measured before and after charging and discharging the lithium battery of Example of the present invention.

Evaluation of Component of Organic Electrolyte Solution $^1$H-nuclear magnetic resonance ($^1$H-NMR) spectrum and $^{31}$P-NMR spectrum were measured for the organic electrolyte solution included in the lithium battery manufactured in Example 19 before and after the charging and discharging performed as in Evaluation Example 1 and the results are shown in FIGS. 2A and 2B.

As shown in FIGS. 2A and 2B, in the organic electrolyte solution after charging and discharging are performed, a peak moves to a downfield in the $^1$H NMR spectrum due to the existence of an electron withdrawing group, compared with the organic electrolyte solution before charging and discharging are performed. Also, phosphine is converted into phosphine oxide and thus a peak moves to a downfield in the $^{31}$P NMR.

Accordingly, oxygen generated in the cathode active material and a phosphor (P) atom of a triphenylphosphine compound included in Example 19 are subjected to a reaction, thereby forming $O=P(C_6H_5)_3$.

Evaluation Example 3

Charge-Discharge Characteristic Test for Battery

The lithium batteries manufactured in Examples 10 through 18 and Comparative Example 2 were charged to 4.53 V at a current of 0.05 C in a $1^{st}$ cycle and discharged to 2.75 V at a current of 0.05 C. Then, the lithium batteries were charged to 4.50 V at a current of 0.1 C in a $2^{nd}$ cycle. Here, the lithium batteries were charged until a current reached 0.05 C while maintaining a voltage of the battery at 4.5 V and the lithium batteries were discharged to 2.75 V at a current of 0.1 C. The lithium batteries were charged to 4.50 V at a current of 0.5 C in a $3^{rd}$ cycle. Here, the lithium batteries were charged until a current reached 0.05 C while maintaining a voltage of the battery at 4.5 V and the lithium batteries were discharged to 2.75 V at a current of 0.1 C.

In the $4^{th}$ through $50^{th}$ cycles, lithium batteries were charged to 4.50 V at a current of 0.8 C. Here, the lithium batteries were charged until a current reached 0.05 C while maintaining a voltage of the battery at 4.5 V and the lithium batteries were discharged to 2.75 V at a current of 1 C. The lithium batteries have a high driving voltage of 4.5 V.

Some discharge capacities and capacity retention rates in the first cycle obtained in the charge-discharge characteristic test are shown in Table 2 below. The capacity retention ratio is defined by Equation 1 below.

Capacity retention ratio at $50^{th}$ cycle (%) = discharge capacity in the $50^{th}$ cycle/discharge capacity in the $4^{th}$ cycle    <Equation 1>

TABLE 2

| | Discharge capacity in $1^{st}$ cycle [mAh] | Capacity retention ratio at $50^{th}$ cycle [%] |
|---|---|---|
| Example 10 | 631 | 60 |
| Example 11 | 649 | 65 |
| Example 12 | 641 | 64 |
| Example 14 | 639 | 67 |
| Example 15 | 633 | 67 |
| Example 16 | 647 | 67 |
| Example 17 | 647 | 65 |
| Comparative Example 2 | 660 | 14 |

As shown in Table 2, the lithium batteries manufactured in Examples 10 through 12 and 14 through 17 have great initial discharge capacity of 630 mhA or above and charging and discharging efficiency thereof is significantly increased compared with that of the lithium battery manufactured in Comparative Example 2.

As described above, according to the one or more of the above embodiments of the present invention, the lithium battery prevents an increase in internal pressure by dissolving gas generated during charging and discharging in an electrolyte solution and thus stability of the lithium battery, and its lifespan, may be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A lithium battery, comprising:
    a cathode including at least one cathode active material that discharges oxygen during charging and discharging;
    an anode; and
    an organic electrolyte solution including a lithium salt, an organic solvent, and at least one compound selected from the group of compounds represented by Formula 1 and Formula 2,

$P(R_1)_a(OR_2)_b$    <Formula 1>

$O=P(R_1)_a(OR_2)_b$    <Formula 2> wherein:
    in Formulae 1 and 2,
    $R_1$ is each independently a substituted or unsubstituted $C_1$-$C_{20}$ alkyl group or a substituted or unsubstituted $C_6$-$C_{30}$ aryl group;
    $R_2$ is each independently a substituted or unsubstituted $C_1$-$C_{20}$ alkyl group or a substituted or unsubstituted $C_6$-$C_{30}$ aryl group;
    a and b are each independently in a range of about 0 to about 3;
    a+b=3;
    if a is equal to or greater than 2, a plurality of $R_1$ are the same or different; and
    if b is equal to or greater than 2, a plurality of $R_2$ are the same or different, and
    the cathode active material that discharges oxygen during charging and discharging includes
    at least one compound selected from the group of $xLiMO_2 \cdot (1-x)Li_2M'O_3$ in which $0 \leq x < 1$, M is at least one metal having an average oxidation number of +3 and is selected from the group of titanium (Ti), vanadium (V), chromium (Cr), manganese (Mn), iron (Fe), cobalt (Co), nickel (Ni), copper (Cu), aluminum (Al), magnesium (Mg), zirconium (Zr), molybdenum (Mo), and boron (B) and M' is at least one metal having an average oxidation number of +4 and is selected from the group of Ti, V, Cr, Mn, Fe, Co, Ni, Cu, Al, Mg, Zr, Mo, and B, and $Li_2M''O_2$ in which M" is at least one metal selected from the group of Ni, Co, Fe, Cu, Ti, and V.

2. The lithium battery of claim 1, wherein, in the compounds represented by Formula 1 and Formula 2, $R_1$ is a substituted or unsubstituted $C_6$-$C_{13}$ aryl group and $R_2$ is a substituted or unsubstituted $C_1$-$C_7$ alkyl group.

3. The lithium battery of claim 1, wherein:
the organic electrolyte solution includes the compound represented by Formula 1, and
the compound represented by Formula 1 includes at least one selected from the group of $P(C_6H_5)_3$, $P(C_6H_5)_2(C_6H_4\text{-p-}CH_3)$, $P(CH_2CH_2CH_2CH_3)_3$, $P(OCH_3)_3$, $P(OCH_2CH_3)_3$, $P(C_6H_5)_2(OCH_2CH_3)$, $P(C_6H_5)(OCH_3)_2$, $P(OCH_2CH_2CH_2CH_3)_3$, and $P(CH_2CH_3)_3$.

4. The lithium battery of claim 1, wherein:
the organic electrolyte solution includes the compound represented by Formula 2, and
the compound represented by Formula 2 includes at least one selected from the group of $O{=}P(C_6H_5)_3$, $O{=}P(C_6H_5)_2(C_6H_4\text{-p-}CH_3)$, $O{=}P(CH_2CH_2CH_2CH_3)_3$, $O{=}P(OCH_3)_3$, $O{=}P(OCH_2CH_3)_3$, $O{=}P(C_6H_5)_2(OCH_2CH_3)$, $O{=}P(C_6H_5)(OCH_3)_2$, $O{=}P(OCH_2CH_2CH_2CH_3)_3$, and $O{=}P(CH_2CH_3)_3$.

5. The lithium battery of claim 1, wherein an amount of the at least one compound selected from the group of compounds represented by Formulae 1 and 2 is in a range of about 0.5 to about 10 parts by weight % based on the total amount of the organic electrolyte solution.

6. The lithium battery of claim 1, wherein lithium metal in the at least one compound selected from the group of $xLiMO_2.(1-x)Li_2M'O_3$ and $Li_2MO_2$ is partially substituted with another alkali metal.

7. The lithium battery of claim 1, wherein oxygen in the at least one compound selected from the group of $xLiMO_2.(1-x)Li_2M'O_3$ and $Li_2MO_2$ is partially substituted with halogen.

8. The lithium battery of claim 1, wherein a concentration of lithium salt included in the organic electrolyte solution is in a range of about 0.5 to about 2 M.

9. The lithium battery of claim 1, wherein an organic solvent included in the organic electrolyte solution includes high-dielectric constant solvents and low-boiling point solvents.

* * * * *